Figure 1:
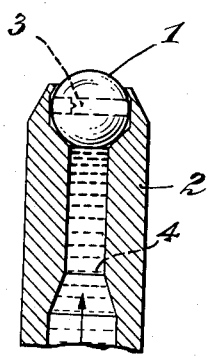

June 18, 1963

A. TREFZER 3,094,103

BALL-POINT PEN INSERT

Filed June 1, 1960

INVENTOR
ALBERT TREFZER

BY Michael S. Striker
ATTORNEY

United States Patent Office 3,094,103
Patented June 18, 1963

3,094,103
BALL-POINT PEN INSERT
Albert Trefzer, Tennenbronn-Bruck, Black Forest, Germany, assignor to Gebr. Schneider G.m.b.H., Tennenbronn, Black Forest, Germany, a corporation of Germany
Filed June 1, 1960, Ser. No. 33,295
5 Claims. (Cl. 120—42.4)

The present invention relates to a ball-point pen insert in which the ball and the ball-retaining socket are made of different materials.

It is an object of the present invention to provide a ball-point pen insert which in writing will produce a line of a uniform width or strength regardless of any changes in temperature.

The object is not attained by the ball-point pens according to prior designs, the individual inserts of which usually consist of a ball of steel or a stainless steel alloy and of a ball-retaining socket which consists of a copper alloy, preferably brass. Although it is very advisable to make these two parts of different materials, the mentioned materials as previously used have the disadvantage that the coefficient of thermal expansion of brass of which the ball socket is usually made is approximately twice as high as that of the ball which usually consists of chromium steel alloy. Consequently, when the temperature increases and the ink paste therefore becomes more fluid, the clearance between the ball and the socket also increases, while when the temperature decreases and the ink paste becomes more viscous, the ball clearance also decreases. The ball clearance therefore increases when it should actually become smaller and it decreases when it should actually become greater. Since the size of the ball clearance is within the order of thousandths of a millimeter, it has been found in actual practice that the temperature coefficients of the mentioned materials are of the greatest importance.

It is therefore another object of the present invention to overcome the above-mentioned disadvantage of previous ball-point pens and pen inserts by making the ball socket of a material which has a coefficient of thermal expansion as compared with the coefficient of the ball so that the ball clearance will decrease at an increase in the temperature and increase as the temperature decreases. In actual practice it has even been found according to the invention that it is advisable to make the ball of the insert of a material, the coefficient of thermal expansion of which exceeds that of the ball socket several times and preferably even as much as ten times.

A very suitable combination of materials of the ball and ball socket may be attained by making the ball of the usual chromium steel with a coefficient of thermal expansion of approximately $10.5 \times 10^{-6}/°C.$ or less. When selecting the materials in accordance with the present invention, the ball clearance of the ball-point pen insert will become smaller as the temperature increases and greater as the temperature decreases, and it will therefore always comply at any temperature with the particular viscosity of the ink paste which becomes more fluid as the temperature increases and more viscous as the temperature decreases. Furthermore, since the ball clearance decreases and the ink paste becomes more fluid as the temperature increases, the capillary forces of the ball point, which contribute very much to maintaining the ink-paste column in position, will also increase, while when the temperature decreases and the ink paste becomes more viscous, the capillary forces will also decrease accordingly. Thus, if the present invention is applied, exactly the opposite conditions will prevail to those which prevail if the ball and ball socket are made of the materials which were previously applied in ball point inserts.

Another very important advantage of a ball point insert according to the invention which could previously not be attained is that, if the ink paste is made of the proper viscosity, its consumption will remain uniform within a wide range of temperature.

A further advantage attained by the invention is that a ball-point insert made according to it will start to write substantially independently of the temperature and will continue to do so with a uniform flow of ink, whereas with the known ball-point inserts the writing became thinner and weaker as the temperature decreased, and it was also much more difficult to start the flow of ink when using the insert for the first time. The new ball-point insert therefore does not require any additional pressure when starting to write with it at the lower temperature. At higher temperatures, the known ball-point inserts tend to smear because the ink paste becomes more fluid and the ball clearance also increases. This disadvantage will likewise be overcome when writing with a ball-point insert according to the invention.

These objects, features, and advantages of the present invention will become further apparent from the following detailed description thereof, particularly when read with reference to the accompanying drawings, in which—

Figure 2:
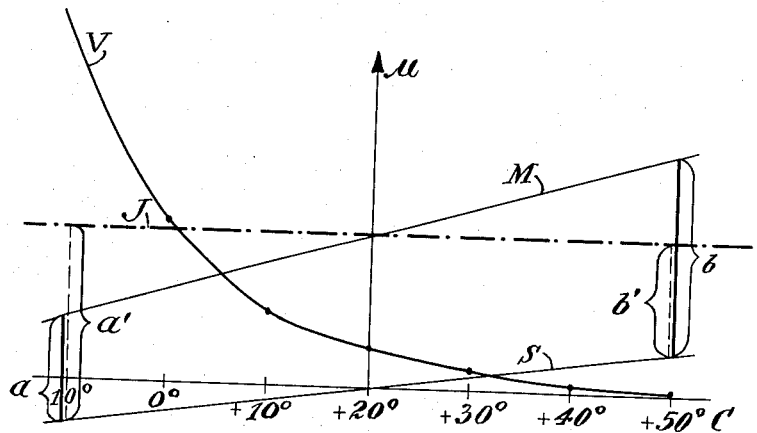

FIGURE 1 shows a highly magnified cross section of the tip of a ball-point insert according to the invention; while FIGURE 2 shows a graphic illustration of the advantages attained according to the invention.

As illustrated in FIGURE 1, the ball 1 of the ball-point pen insert consists, for example, of chromium steel, while the ball socket 2 consists, for example, of Invar steel. The control zone 3 between ball 1 and socket 2 is indicated by broken lines and a bracket. A supply of ink paste 4 is illustrated in phantom and the direction of flow thereof is shown by an arrow. The zone 3 primarily determines the ball clearance upon which the strength of the flow of ink paste 4 partly depends. Another factor is the viscosity of the ink paste 4, which decreases upon an increase in temperature. Thus, the consumption of ink paste per unit of written lines or strength of lines depends in part upon the cross-sectional area of the ink passage which, as seen from the front, is located substantially within the plane of the diametric line of the ball within its socket and the position of which is dependent upon the particular shape of the inwardly flanged part of the ball socket. Since the coefficient of thermal expansion of steel ball 1 is considerably larger than that of the ball socket of Invar steel, the inventive independence of the writing characteristics of the ball-point insert upon the temperature will be attained within the entire temperature range which is to be expected in actual practice. It will therefore usually not even be necessary to provide a special ink paste for tropical conditions.

In FIGURE 2, the ball clearance is represented by the ordinate $\mu$, while the temperature in degrees C. is plotted on the abscissa. The straight line S represents the characteristic of the thermal expansion of the steel ball. The straight line M represents the corresponding characteristic of a ball socket consisting of brass, while the straight line J represents the analogous characteristic of a ball socket made of Invar steel according to the invention. The mentioned parts may, for example, be made of such dimensions that the ball clearance at a temperature of $+20°$ C. will be within the order of magnitude of $1\mu$ or less. The normal course of the characteristic of the viscosity of the ink paste is plotted in FIGURE 2 at V.

In order to illustrate the invention, FIGURE 2 shows a graphic comparison of the temperature characteristics of a ball-point pen insert of a conventional type with a ball socket of Invar steel according to the invention. In both cases it is assumed that a ball of chromium-alloyed steel is used. This illustration shows that the ball clearance of the conventional ball-point inserts which is required for the flow of the ink paste at the so-called control zone 3, as shown in FIGURE 1, is considerably smaller at a lower temperature of, for example, −10° C., as indicated by the distance *a*, than at a higher temperature of, for example, 50° C., as indicated by the much greater distance *b*. It must further be considered that the ink paste is highly viscous at a low temperature, while at a higher temperature it is comparatively fluid. This still further increases the unfavorable conditions caused by the mentioned difference in the thermal expansion of the two parts at different temperatures since the smaller cross-sectional area of the ink passage produced by the ball clearance *a* will at a low temperature allow the passage of hardly any of the much more viscous ink paste, while at a high temperature the much more fluid ink paste will flow very easily through the relatively large cross-sectional area of the passage produced by the ball clearance *b*.

If, on the other hand, the ball socket is made according to the invention, for example, of Invar steel, the flow of ink paste will have the desired uniformity at any temperature. In this case, the cross-sectional area for the passage of ink paste at the control zone 3 corresponds at a temperature of, for example, −10° C., to the much larger ball clearance *a′*, as indicated in FIGURE 2, while at a temperature of +50° C. it will be considerably smaller and correspond to the ball clearance as indicated by the distance *b′*. The graphic illustration according to FIGURE 2 shows clearly that the aforementioned object of the invention will be attained as completely as is practically possible. At low temperatures, the cross-sectional passage is relatively large in accordance with the higher viscosity of the ink paste, while at higher temperatures it is relatively small and thus again in accordance with the relatively high fluidity of the ink paste.

Although my invention has been illustrated and described with reference to the preferred embodiment thereof, I wish to have it understood that it is in no way limited to the details of such embodiment but is capable of numerous modifications within the scope of the appended claims. Particularly, it is to be understood that the invention is not limited to the specific materials of the ball and ball socket as mentioned herein but that any other suitable materials may also be used as long as they will fulfill the requirement that the coefficient of thermal expansion of the ball is greater than that of the ball socket.

Having thus fully disclosed my invention, what I claim is:

1. A ball-point pen insert for use with ink having a viscosity decreasing upon an increase in temperature, comprising, in combination, a socket; and a ball positioned in and partly surrounded by said socket with relatively small clearance so as to be retained thereby, said ball being made of a material having a coefficient of thermal expansion several times as high as that of the material of said socket, whereby said clearance between said ball and socket will decrease upon an increase in temperature and vice versa so as to compensate for corresponding changes in said viscosity of said ink.

2. A ball-point pen insert for use with ink having a viscosity decreasing upon an increase in temperature, comprising, in combination, a socket consisting of metal; and a ball positioned in and partly surrounded by said socket with relatively small clearance so as to be retained thereby, said ball being made of a material having a coefficient of thermal expansion several times as high as that of said metal of said socket, whereby said clearance between said ball and socket will decrease upon an increase in temperature and vice versa so as to compensate for corresponding changes in said viscosity of said ink.

3. In a ball-point pen, in combination, a socket having a passage therethrough; a supply of ink having a viscosity decreasing upon an increase in temperature, said supply of ink being connected to said passage for flow therethrough; and a ball positioned in said passage and embraced by the material of said socket with relatively small clearance so as to be retained thereby, said ball consisting of a material having a coefficient of thermal expansion exceeding that of the material of said socket at least ten times, whereby said clearance between said ball and socket will decrease upon an increase in temperature and vice versa so as to compensate for corresponding changes in said viscosity of said ink.

4. A ball-point pen insert for use with ink having a viscosity decreasing upon an increase in temperature, comprising, in combination, a socket made from Invar steel; and a ball positioned in and partly surrounded by said socket with relatively small clearance so as to be retained thereby, said ball being made of a material having a coefficient of thermal expansion several times as high as that of said Invar steel, whereby said clearance between said ball and socket will decrease upon an increase in temperature and vice versa so as to compensate for corresponding changes in said viscosity of said ink.

5. A ball-point pen insert comprising, in combination, a ball; and a ball socket surrounding said ball in part with small clearance and retaining the same, said ball being made of chromium steel and said ball socket being made of Invar steel, whereby said clearance between said ball and said ball socket will decrease as the temperature increases and vice versa so as to compensate for the change of viscosity of ink paste used in the ball-point pen.

References Cited in the file of this patent

UNITED STATES PATENTS

| | | |
|---|---|---|
| 2,536,124 | Bolvin et al. | Jan. 2, 1951 |
| 2,573,691 | Chesler | Nov. 6, 1951 |

FOREIGN PATENTS

| | | |
|---|---|---|
| 1,108,400 | France | Aug. 31, 1955 |